United States Patent
Lepp et al.

(10) Patent No.: US 10,951,728 B2
(45) Date of Patent: Mar. 16, 2021

(54) PROXY FOR ACCESS OF A VEHICLE COMPONENT

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/272,854

(22) Filed: Feb. 11, 2019

(65) Prior Publication Data
US 2020/0259919 A1    Aug. 13, 2020

(51) Int. Cl.
| H04L 29/06 | (2006.01) |
| H04W 4/44 | (2018.01) |
| H04W 4/48 | (2018.01) |
| H04L 29/08 | (2006.01) |
| G06F 9/54 | (2006.01) |
| G07C 5/00 | (2006.01) |

(52) U.S. Cl.
CPC .......... *H04L 67/2852* (2013.01); *G06F 9/541* (2013.01); *G07C 5/008* (2013.01); *H04L 67/125* (2013.01); *H04L 67/2833* (2013.01)

(58) Field of Classification Search
None
See application file for complete search history.

(56) References Cited

U.S. PATENT DOCUMENTS

| 9,794,297 B1* | 10/2017 | Hamilton, II | H04L 63/08 |
| 2004/0185842 A1* | 9/2004 | Spaur | B60R 25/25 |
| | | | 455/420 |
| 2014/0143839 A1* | 5/2014 | Ricci | B60R 16/037 |
| | | | 726/4 |
| 2014/0325602 A1 | 10/2014 | Kwon | |
| 2015/0020152 A1* | 1/2015 | Litichever | H04L 63/08 |
| | | | 726/1 |
| 2018/0219878 A1 | 8/2018 | Hirshberg | |
| 2018/0343262 A1* | 11/2018 | Anderson | B60R 16/0234 |
| 2019/0394089 A1* | 12/2019 | Barrett | H04L 67/34 |
| 2020/0160633 A1* | 5/2020 | Zhang | B60R 25/102 |

FOREIGN PATENT DOCUMENTS

WO    01/26338 A2    4/2001

OTHER PUBLICATIONS

European Patent Office, Extended European Search Report for Appl. No. 20156759.1 dated Apr. 30, 2020 (7 pages).
Viper Smartstart, Connect Your Car! Start, Control, and Locate Your Car From Virtually Anywhere, Jan. 20, 2019 (5 pages).
embedded.com Re-evaluating the role of the LIN Bus in vehicle sensor and control applications, Nov. 2, 2014 (6 pages).
Apps on Google Play, Audi A3 e-tron connect, Audi Maps and Navigation, Sep. 2016 (3 pages).

* cited by examiner

*Primary Examiner* — Ajit Patel
(74) *Attorney, Agent, or Firm* — Trop, Pruner & Hu, P.C.

(57) ABSTRACT

In some examples, a proxy is provided to enable access of an internal network of a vehicle from an entity coupled to an external network. Responsive to a request received over the external network to access a vehicle component over the internal network, the proxy applies a security policy to determine whether to allow the access of the vehicle component over the internal network.

18 Claims, 5 Drawing Sheets

PROXY FOR ACCESS OF A VEHICLE COMPONENT

TECHNICAL FIELD

The invention relates generally to proxies for access of vehicle components.

BACKGROUND

A vehicle can include various electronic components for controlling or interacting with respective subsystems in the vehicle. Examples of electronic components include electronic control units (ECUs). The electronic components can communicate over a network in a vehicle. Examples of networks that can be used in vehicles include a controller area network (CAN) bus, a local interconnect network (LIN) bus, and others. Some vehicles can also include more advanced networks, such as an Ethernet network.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer to any type of transport structure to carry cargo and/or people between different physical locations. Examples of vehicles include any or some combination of the following: a car, a truck, a watercraft (e.g., a boat, a yacht, a ship, etc.), an aircraft, a spacecraft, a railed vehicle (e.g., a train), a cargo transportation unit (e.g., a container, a trailer, a platform, etc.), pedestrians carrying one or more sensors, bicycles, and others.

A vehicle may include various internal networks to allow communication among electronic components. For example, a vehicle can include a controller area network (CAN) bus and a local interconnect network (LIN) bus that are used to communicate with respective different subsets of electronic components, including electronic components that control or interact with any or some combination of the following subsystems: a subsystem including sensors to detect passengers or cargo, a brake subsystem, a powertrain subsystem (which includes a transmission and engine, for example), a subsystem that includes power doors, power mirrors, power windows and/or a sunroof, a cruise control subsystem, a subsystem that includes an automatic windshield wiper, a subsystem that includes vehicle lights, control of power mirrors, and other subsystems.

A vehicle may also include an internal network to allow for high-speed communications (at higher speeds than typically available over a CAN bus or LIN bus) between electronic components. This can be an Ethernet network or some other type of backbone network. Some components that may send a large amount of data or that may send data at high data rates include any or some combination of the following: cameras, high data rate sensors, a Lidar component that measures a distance to a target by emitting light and measuring a reflected light, a radar, and others.

The presence of networks in a vehicle may expose electronic components of the vehicle to unauthorized access or an attack, either by an electronic component in the vehicle or by an external entity outside of the vehicle.

A vehicle may be provided with communication components to allow the vehicle to communicate with entities external of the vehicle. An entity that is "external" of the vehicle can refer to a human or machine that is remote or separated from the vehicle, or a human or machine that is within a compartment of the vehicle for carrying passengers or cargo. The entity is "external" of the vehicle in the sense that the entity is not part of the equipment that makes up or is part of the vehicle.

Communications by vehicles with external entities can be referred to as vehicle-to-everything (loosely termed "V2X") communications. V2X is a feature that provides for communication of information between a vehicle and other entities that may affect the vehicle and/or the other entities. V2X includes communication of a vehicle to/from any or some combination of the following: other vehicles (vehicle-to-vehicle or V2V communication); an infrastructure, e.g., roadside units (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and others.

Networks that support V2X communication can include a cellular network or another type of wireless network or any combination. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and others.

In further examples, cellular networks can be fifth generation (5G) or beyond cellular networks.

Further types of wireless networks can include a short-range wireless network, such as a Bluetooth link, a Bluetooth Low Energy (BLE) link, a Radio Frequency Identification (RFID) link, a Near Field Communication (NFC) link, an optical link, a Transfer Jet link, and others.

Other types of wireless networks can include a wireless local area network (WLAN) that operates according to the Institute of Electrical and Electronics Engineers (IEEE) 802.11 standards (e.g. Dedicated Short Range Communication (DSRC)), IEEE 802.11a standards, IEEE 802.11p standards, IEEE 802.11bd standards (e.g. Enhancements for Next Generation V2X), an Integrated Digital Enhanced Network (iDEN), and others.

The Institute of Electrical and Electronics Engineers (IEEE) 802.11p is an amendment to the IEEE 802.11 standard to add wireless access in vehicular environments (WAVE). IEEE 802.11p defines enhancements to IEEE 802.11 for supporting intelligent transportation systems.

IEEE 802.11a is an amendment to the IEEE 802.11 standard that defines requirements for an orthogonal frequency division multiplex (OFDM) communication system.

IEEE 802.11bd is an amendment to the IEEE 802.11 standard that defines further requirements for intelligent transportation systems (ITS) that are backwards compatible with IEEE 802.11p technology.

Coupling multiple internal networks (e.g., a CAN bus, a LIN bus, an Ethernet network, etc.) of a vehicle together, such as through a gateway, may expose data and functions between the internal networks. Further, connecting the vehicle to an external network to allow communications between the vehicle and an external entity can expose the electronic components of the vehicle to unauthorized access or an attack by the external entity.

Figure 1:
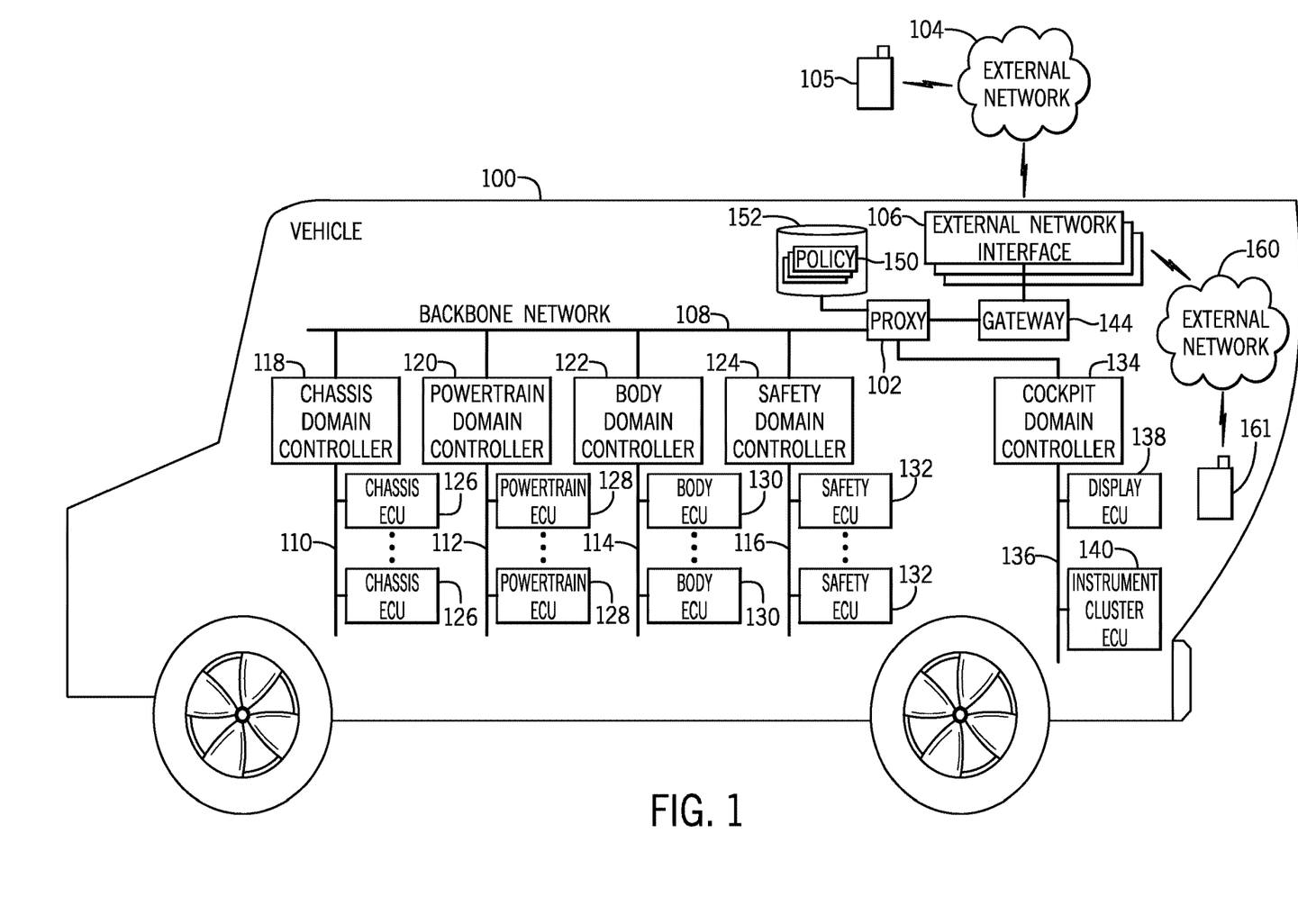
FIG. 1 is a block diagram of an arrangement that includes a vehicle that has a proxy according to some implementations of the present disclosure.

As shown in FIG. 1, in accordance with some implementations of the present disclosure, a vehicle 100 includes a proxy 102 that controls secured access of a vehicle component over an internal bus of the vehicle 100 according to a security policy 150. The access of the vehicle component can be responsive to a command responsive to a request from an external entity 105 received over an external network 104 (wireless network or wired network) by the proxy 102.

As used here, a "proxy" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "proxy" can refer to a combination of a hardware processing circuit and machine-readable instructions (software and/or firmware) executable on the hardware processing circuit. Furthermore, a "proxy" can refer to a module of machine-readable instructions added to an existing hardware processing circuit, or alternatively, the "proxy" can refer to a module include a hardware processing circuit and/or machine-readable instructions placed between other modules.

The proxy 102 provides a layer between vehicle components that reside on an internal network of the vehicle 100 and an external entity coupled to the external network 104. The proxy 102 is able to broker communications between different domains, which involves applying policies to determine whether or not access of vehicle components in one or more vehicle domains responsive to requests from one or more other domains is permitted (discussed further below). The different domains can include a first domain including the external network 104 and a second domain including an internal network. Alternatively, the different domains can include different internal networks. An example of an internal communication between vehicle components can include a communication of status information or control information between different electronic components (e.g., ECUs) in the vehicle 100.

Although the vehicle 100 is shown with a specific arrangement of components and internal networks, it is noted that in other examples, different arrangements of components and internal networks can be used.

Figure 3:
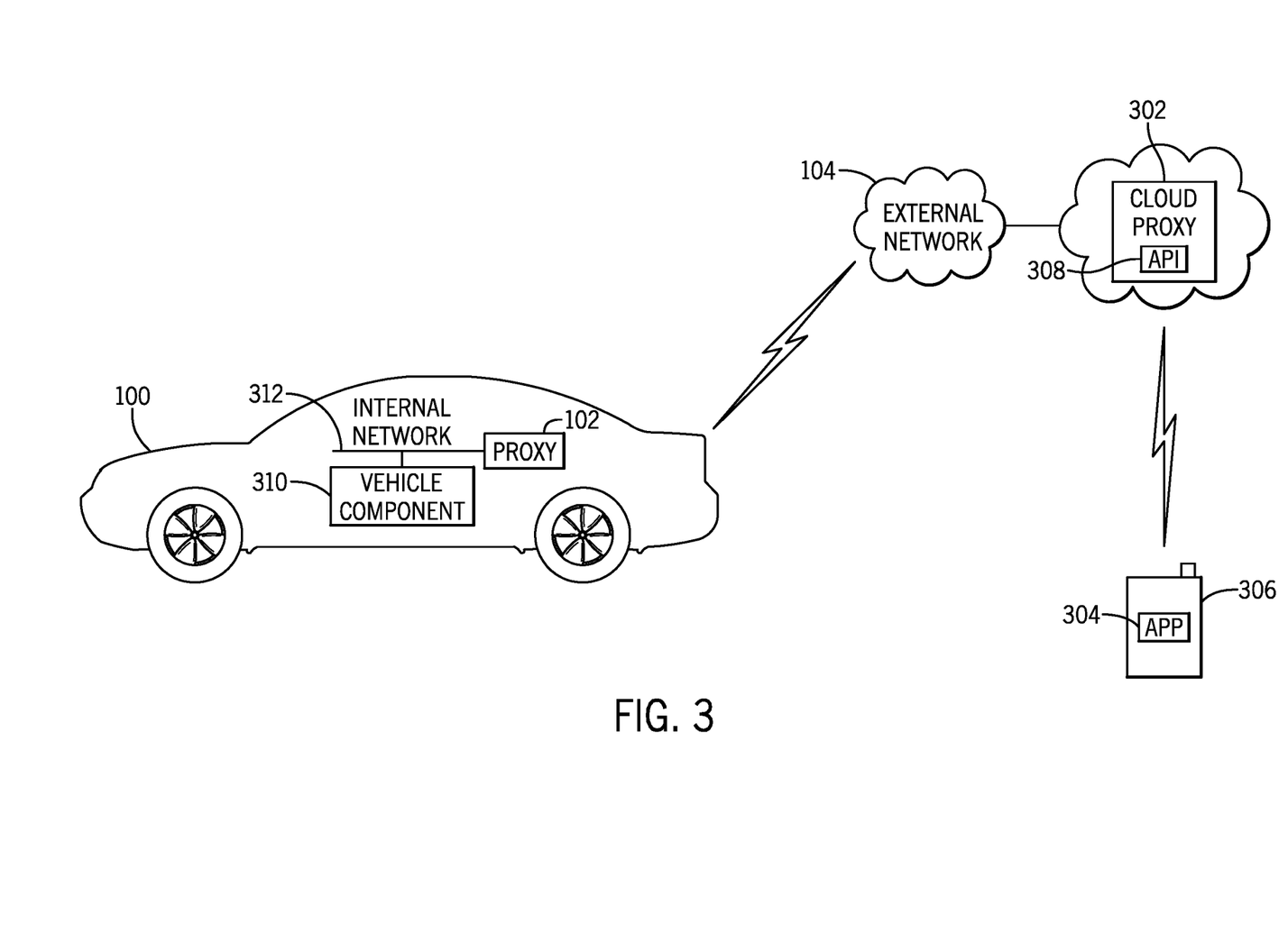
FIG. 3 is a block diagram of an example arrangement that includes a proxy in a vehicle and a cloud proxy, according to further implementations of the present disclosure.

In other examples, instead of or in addition to providing the proxy 102 in the vehicle 100, a proxy that is external of the vehicle 100 can be provided. For example, a remote proxy can be included in a cloud, a server, a website, and others. The remote proxy is able to communicate with the vehicle 100 over a network, such as a cellular network, a WLAN, and others. The remote proxy can control secured access of vehicle components in the vehicle. An example of a remote proxy (302) is shown in FIG. 3.

The vehicle 100 includes one or more external network interfaces 106. An external network interface is able to communicate over a corresponding external network, such as the external network 104. Although one external network 104 is shown in FIG. 1, it is noted that there may be multiple external networks. Examples of external networks can include a cellular network, a WLAN, a Bluetooth link, a DSRC link, and others. For example, the external network interfaces 106 can thus include a cellular network interface, a WLAN (or Wi-Fi network interface), a Bluetooth interface, a DSRC interface, and others.

In some examples, an external network interface can include a transceiver to transmit and receive information. The external network interface may also include protocol layers that govern protocols employed in communications over a respective external network.

An external network interface 106 may be present in a gateway (e.g., a gateway 144 shown in FIG. 1), or the external network interface 106 may be present in another subsystem of the vehicle 100, such as the entertainment subsystem or a different subsystem. If the external network interface 106 is part of the entertainment subsystem, the act of streaming music from a web-based streaming service may involve routing data packets containing the music from the external network 104 to a music player application within the entertainment system. However, if a request is received from the external network 104 to control or request information of a vehicle component, data packet(s) containing the request can be routed to the proxy 102 for handling by the proxy 102. For example, a request to roll up or down a window (or to control another component) of the vehicle 100 received from an external entity over the external network 104 can be routed to the proxy 102, which can determine whether the request from the external entity is permitted. If so, the proxy 102 sends a corresponding command to the appropriate internal network, for passing to the respective electronic component (e.g., an ECU) that controls power windows of the vehicle 100.

Note that the external network 104 can be external of the vehicle 100 (e.g., a cellular network, a WLAN, or a DSRC link that is outside of the vehicle 100). Alternatively, an external network can refer to a network 160 (e.g., a WLAN, a Bluetooth link, etc.) within the vehicle 100, such as in a passenger compartment, a driver compartment, or a cargo compartment of the vehicle 100, for communicating with an external entity 161 (human or machine) within the vehicle 100. The external network 160 can be referred to as an "inside-vehicle external network."

In further examples, an external network interface 106 may be implemented as an AP, such as a WLAN AP, which can establish a WLAN within the vehicle 100 (such as in the driver compartment, the passenger compartment, or the cargo compartment), to communicate with external entities in the vehicle 100.

Note that an external network that is located within the vehicle 100 is separate from the internal networks of the vehicle 100. An internal network of the vehicle 100 refers to a network communicatively coupled to electronic components of the vehicle 100 that control various aspects of the vehicle 100. The external network that is within the vehicle 100 is used for communicating with external entities that may be located within the vehicle 100, but are not part of the vehicle 100.

The internal networks of the vehicle 100 in the example shown in FIG. 1 include a backbone network 108, and various vehicle buses 110, 112, 114, 116, and 136 connected to respective domain controllers. The backbone network 108 can include an Ethernet network, a Flexray network, an HDbaseT network, or any other type of network. A vehicle bus can include a CAN bus, a LIN bus, or any other type of bus.

A domain controller can act as a gateway between the corresponding vehicle bus and another entity, such as the backbone network 108 or the proxy 102. A domain controller can be implemented as a hardware processing circuit, or as a combination of a hardware processing circuit and machine-readable instructions executable on the hardware processing circuit.

Although specific internal networks are shown in FIG. 1, it is noted that a smaller number, larger number, or alternative internal networks can be used in other examples. Further, one or more of the domain controllers shown in FIG. 1 can be omitted. Also, in other examples, one or more of the vehicle buses 110, 112, 114, 116, and 136 can be connected to the proxy 102, instead of being connected through a respective domain controller.

In the example of FIG. 1, the vehicle bus 110 is connected to a chassis domain controller 118, the vehicle bus 112 is connected to a powertrain domain controller 120, the vehicle bus 114 is connected to a body domain controller 122, the vehicle bus 116 is connected to a safety domain controller 124, and the vehicle bus 136 is connected to a cockpit domain controller 134.

One or more chassis ECUs 126 are connected over the vehicle bus 110 to the chassis domain controller 118. Examples of subsystems that can be controlled by the chassis ECU(s) 126 include a tire pressure monitoring (TPMS) subsystem, roll and stability sensors such as yaw rate and lateral acceleration sensors, an electronic stability control subsystem, a hydraulics subsystem, solenoids, valves, etc.

One or more powertrain ECUs 128 are connected over the vehicle bus 112 to the powertrain domain controller 120. Examples of subsystems that can be controlled by the powertrain ECU(s) 128 include a transmission, an engine, and others.

One or more body ECUs 130 are connected over the vehicle bus 114 to the body domain controller 122. Examples of subsystems that can be controlled by the body ECU(s) 130 include power mirrors, power windows, power locks, power doors, power seats, and others.

One or more safety ECUs 132 are connected over the vehicle bus 116 to the safety domain controller 124. Examples of subsystems that can be controlled by the safety ECU(s) 130 include a lane departure alert subsystem, an automatic braking subsystem, an anti-lock brake subsystem, and others.

In the example of FIG. 1, the domain controllers 118, 120, 122, and 124 are connected to the backbone network 108 to allow the domain controllers 118, 120, 122, and 124 to communicate with the proxy 102. In other examples, one or more of the domain controllers 118, 120, 122, and 124 can be connected to the proxy 102 without being connected to the backbone network 108.

Examples of ECUs that are connected over the vehicle bus 136 to the cockpit domain controller 134 include a display ECU 138 (for controlling a display panel that a driver or passenger can access), an instrument cluster ECU 140 that controls indicators of an instrument cluster, and other ECU(s).

In the example of FIG. 1, the gateway 144 is provided between the external network interfaces 106 and the proxy 102. The gateway 144 can translate between a communication format or protocol used by an external network interface 106 and a communication format or protocol used by the proxy 102.

In other examples, the proxy 102 can be connected to the external network interfaces 106 without passing through the gateway 144.

The proxy 102 is able to access one or more policies 150 contained in a policy database 152 stored in a storage medium. The storage medium can include a storage device or multiple storage devices.

An example policy 150 that can be accessed by the proxy 102 is a security policy that includes one or more rules establishing what entities are allowed access to respective vehicle components over internal networks (e.g., the backbone network 108 and/or any of the vehicle buses 110, 112, 114, 116, and 126). The security policy prevents an entity from placing arbitrary or unauthorized commands on internal networks of the vehicle 100.

Figure 2:
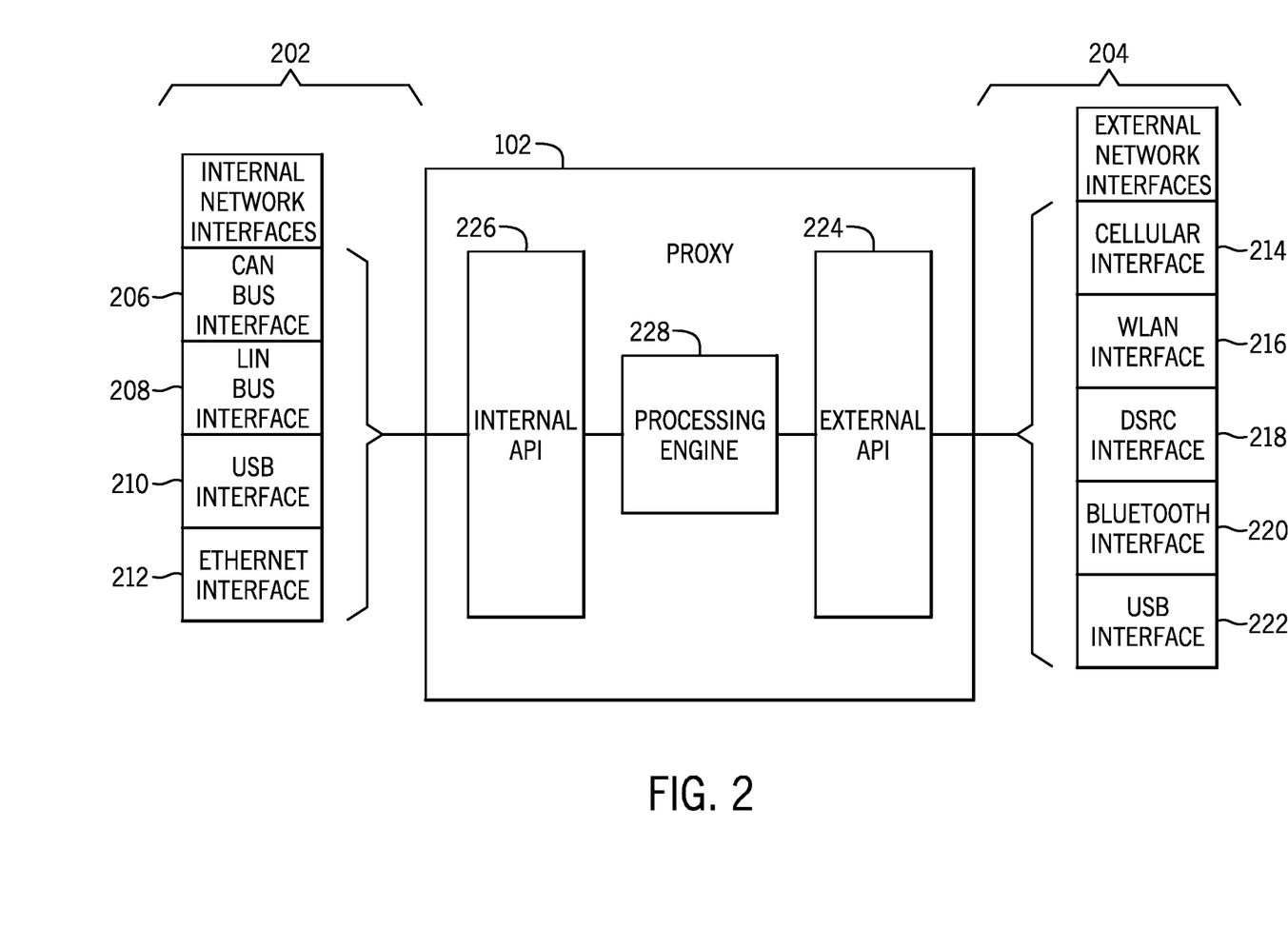
FIG. 2 is a block diagram of an example arrangement that includes a proxy connected to various network interfaces, according to some implementations of the present disclosure.

FIG. 2 shows an example of the proxy 102 that is located at a boundary between a private zone 202 of the vehicle 100 and a non-private zone 204 of the vehicle 100. The private zone 202 is made up of the electronic components and subsystems of the vehicle 100. The non-private zone 204 is external of the private zone 202. On the private zone 202 side, the proxy 102 can be connected to various internal network interfaces, including, as examples, a CAN bus interface 206, a LIN bus interface 208, a Universal Serial Bus (USB) interface 210, an Ethernet interface 212, and others. An internal network interface can refer to any circuitry and/or machine-readable instructions that allow the proxy 102 to communicate over the respective internal network. The internal network interfaces can be connected to the internal networks of the vehicle 100, and/or to domain controllers.

On the non-private zone 204 side, the proxy 102 can be connected to various external network interfaces, either directly or indirectly (e.g., through a gateway 144 in FIG. 1), including, as examples, a cellular network interface 214, a WLAN network interface 216, a DSRC interface 218, a Bluetooth interface 220, and a USB interface 222.

In some examples, the proxy 102 includes application programming interfaces (APIs) 224 and 226. The API 226 is an external API, and the API 224 is an internal API. An API refers to a library of routines that can be called by an entity to invoke a respective action. In the present disclosure, the library of routines of an API can include routines that are called to control a vehicle component, to access information of a vehicle component, or to otherwise interact with a vehicle component. Examples of APIs can include any or some combination of the following: a Representational State Transfer (REST) API, a Constrained Application Protocol (CoAP) API, a Message Queue Telemetry Transport (MQTT) API, and others.

An external entity calls one or more routines of the external API 224 to invoke an action in the vehicle 100. An internal entity calls one or more routines of the internal API 226 to invoke an action in the vehicle 100. Calling a function of an API can refer to sending a request to the API that invokes the function.

In other examples, instead of using the APIs 224 and 226, the proxy 102 can include other interfaces for receiving requests to invoke actions in the vehicle 100.

In further examples, each API 224 or 226 can pass events between different entities. For example, an event (e.g., an event including status information, an event including an alert or alarm, or any other event) that occurred in a vehicle component can be passed through the internal API 226 to another vehicle component, or to an external entity. As another example, an event that occurred in an external entity (e.g., an application at a smartphone or other user device) can be passed through the external API 224 to a vehicle component.

The proxy 102 includes a processing engine 228 that receives a command or event responsive to a request or an event over a respective network (the external network 104 or an internal network) from an entity (an external entity or an internal entity of the vehicle). An internal entity can include, for example, an ECU that is connected to one of the vehicle buses 110, 112, 114, 116, and 136, or in a different example, the internal entity can include a domain controller.

The processing engine 228 can include a portion of the hardware processing circuit of the proxy 102, or alternatively, the command processing engine 228 can include machine-readable instructions executable by the proxy 102.

In some examples, the processing engine 228 receiving a command over a respective network can refer to the processing engine 228 receiving the command from the corresponding API 224 or 226 (or other interface), in response to a request over the respective network.

In further examples, the proxy 102 can expose different classes of external APIs to different applications. For example, a REST or MQTT API can be used with a smartphone application or a cloud-based application, while a CoAP API can be used with a maintenance application, such as that used by a service technician for the vehicle 100. In other examples, other classes of APIs can be defined for different classes of entities. The different classes of APIs can be associated with different security policies 150 that govern secure access of vehicle components. For example, a first security policy 150 can specify that smartphone applications are allowed access to a first subset of aspects of the vehicle 100, and a second security policy 150 can specify that maintenance applications are allowed access to a second subset of aspects, where the second subset of aspects can include the first subset plus other aspects. More generally, subsets of aspects of the vehicle 100 governed by different security policies may overlap, may intersect, or may be exclusive of one another.

In additional examples, each API 224 or 226 can be organized into multiple different functional groups. Different entities can be associated with the different functional groups. Entities associated with a functional group are able to access a specific subset of routines of the API. The different functional groups are associated with respective different security policies 150. For example, entities associated with a first functional group can access a first subset of routines of the API, entities associated with a second functional group can be access a second subset of routines of the API, and others. In specific examples, the first functional group may control door locks, windows, vehicle starting, and others. A second functional group may access vehicle positioning information, engine status information, and others. The security policy 150 associated with a given functional group can restrict access of the API to the respective subset of routines of the API; in other words, entities associated with the given functional group are allowed access to only the respective subset of routines of the API. A subset of routines may give access to certain data or metadata available in the vehicle.

More generally, each functional group can be associated with portions of one or more APIs of the proxy 102.

For a given vehicle manufacturer, an API can remain the same across all models of vehicles made by the vehicle manufacturer, even if the different models use different arrangements of internal networks and/or vehicle components. The processing engine 228 of the proxy 102 can be configured differently for different vehicle models, so that the processing engine 228 can cause a call of a given function of the API to be translated to one or more commands sent over a CAN or LIN bus for a first vehicle model, and to be translated to one or more commands sent over an Ethernet network for a second vehicle model, as examples. Different commands (for different vehicle models) produced by the processing engine 228 of the proxy 102 in response to a call of the given function of the API can include common information shared across multiple vehicle models, as well as model-specific additional information for a respective vehicle model.

In some examples, an API (e.g., 224 or 226) is session based. An entity can discover and can authenticate with the proxy 102. As a result of successful authentication (i.e., the entity has registered with the proxy 102), the entity is associated with one or more functional groups. The one or more functional groups are associated with one or more respective security policies 150, which the proxy 102 can apply to control access of vehicle aspects by the entity. The authenticated entity is able to access only the subset of routines of the one or more APIs associated with the one or more functional groups that the entity is associated with.

Note also that a given API (or portion of an API) may be associated with multiple functional groups.

In some examples, an entity (e.g., an application running on a user device) can register with the proxy 102. The entity can initiate communication with a provisioning service running on the vehicle 100. The provisioning service may be part of the proxy 102, or may be separate from the proxy 102. The provisioning service can assign an entity credential to the entity, where the entity credential can include, as examples, a passphrase or code, a public key/private key pair, a certificate, access token, or any other type of credential. The entity can use the entity credential to establish a session with the proxy 102. The proxy 102 can use the credential to identify the device 306 or application 304 that is the source of the session or command. The entity certificate can be associated with one or more functional groups, which in turn is associated with one or more security policies that govern access of aspects of the vehicle 100 by the entity.

In alternative examples, the proxy 102 is provisioned with a proxy certificate at manufacture of the vehicle 100 or at a different time. The certificate can include a private key, for example. The entity seeking to register with the proxy 102 can register and obtain a certificate from a cloud service that has the same root of trust as the proxy 102. The entity communicates with the provisioning service in the vehicle 100 to derive an entity credential (based on the certificate obtained by the entity from the cloud service). The entity credential can be used for a session with the proxy 102.

In some examples, a user (e.g., an owner or operator of the vehicle 100) can configure remote access of aspects of the vehicle 100. For example, using a display panel in a vehicle console of the vehicle 100, or using a user interface of a user device (e.g., a smartphone), the user can authenticate with the proxy 102 (or with a cloud service), and the user can use the vehicle display panel or the user interface of the user device to select which aspects of the vehicle 100 are remotely accessible by external entities. The user selections can enable or disable routines of an API of the proxy 102. The proxy 102 can receive user selections made at a user interface regarding which of the routines of the API are accessible over one or more external networks and which of the plurality of routines of the API are inaccessible over the one or more external networks. For example, the user can enable or disable remote access to control the vehicle climate settings, lock or unlock vehicle doors, raise or lower vehicle windows, open or close a sunroof or moonroof, retract or store a convertible roof, perform remote starting of an engine, and others.

When a vehicle manufacturer updates or adds features of the vehicle 100, an update of the proxy 102 can be performed to update or add functions to the proxy 102, so that the updated or added features of the vehicle 100 can be accessed. When adding a new feature to the vehicle, the new feature can be initially installed in the disabled state (i.e., disabled from access by an external entity). A user may be prompted or informed of the new feature, which the user can enable if desired. Note that the features of the vehicle 100 can be updated or added after the vehicle 100 is placed into service.

The user may also be able to specify security policies 150 to implement for access of features of the vehicle 100, using the vehicle display panel or user interface of the user device.

FIG. 3 illustrates an example that includes a cloud proxy 302 that is accessible by an external entity, such as an application 304 in a user device 306. The application 304 in the user device 306 is able to authenticate with the cloud proxy 302, so that the application 304 can establish a session with the cloud proxy 302 over a network, such as a wireless network or wired network. In some examples, the cloud proxy 302 can include an API 308 that is similar to the external API 224 of FIG. 2. The application 304 is able to send a request to the API 308 of the cloud proxy 302, which in turn can issue a corresponding command over the external network 104 to the vehicle 100.

In examples according to FIG. 3, the vehicle 100 also includes the proxy 102. In such an arrangement, the cloud proxy 302 and the proxy 102 can interact with one another (e.g., over a secure channel) to send a command responsive to the request from the application 304 to a vehicle component 310 over an internal bus 312 of the vehicle 100. For example, the request from the application 304 can be a request to remotely start the engine of the vehicle 100. In response to the request, the cloud proxy 302 and the proxy 102 can send the respective engine start command over the internal network 312 to start the engine of the vehicle 100.

In other examples, the proxy 102 can be omitted from the vehicle 100.

The following describes an example process of how the user device 306 is able to establish a session with the cloud proxy 302 or with the proxy 102 in examples where the cloud proxy 302 is not deployed. In other examples, other processes can be employed.

The user device 306 associates and authenticates with a wireless network over which the user device 306 is able to communicate with the proxy (e.g., cloud proxy 302 or proxy 102), such as through the gateway 144 (FIG. 1). If the wireless network is local to the vehicle, the association and authentication with the wireless network can use a pre-shared key (PSK), a Device Provisioning Protocol (DPP) procedure, or any other type of procedure. If the wireless network is remote to the vehicle, the user device 306 may authenticate through the gateway 144. At this point, the user device 306 has network access through the gateway 144, but does not yet have permission to access the proxy.

Next, if the application 304 is not preconfigured with information of the proxy, the application 304 discovers the proxy as a service available on the wireless network. This discovery can be based on pre-association discovery according to IEEE 802.11aq, for example. Alternatively, the discovery can be according to multicast domain name system (mDNS) discovery, Universal Plug and Play (uPNP) discovery, Bonjour discovery, and others.

After discovering the proxy, the application 304 initiates a secure connection with the proxy. The secure connection can employ a Transport Layer Security (TLS) technology, a Secure Socket Layer (SSL) technology, a Hypertext Transfer Protocol 3 (HTTP3) technology, a Datagram Transport Layer Security (DTLS) technology, a Virtual Private Network (VPN) technology, and others. The secure connection with the proxy can also involve the application 304 authenticating with the proxy for access to the vehicle 100.

Once the secure connection is established, the application 304 can call the API of the proxy, to access an aspect of the vehicle 100. On each API call, the proxy checks the policy of the application 304 to determine whether the application is authorized to call that API. The proxy accesses the policy 150 by requesting policy information for the user device from the policy database 152 using the user device credential (e.g., the user device credential can include an identity of the user device and secret information used to authenticate the identity). The proxy can request the policy 150 after the user device completes authentication or on each API call.

Figure 4:
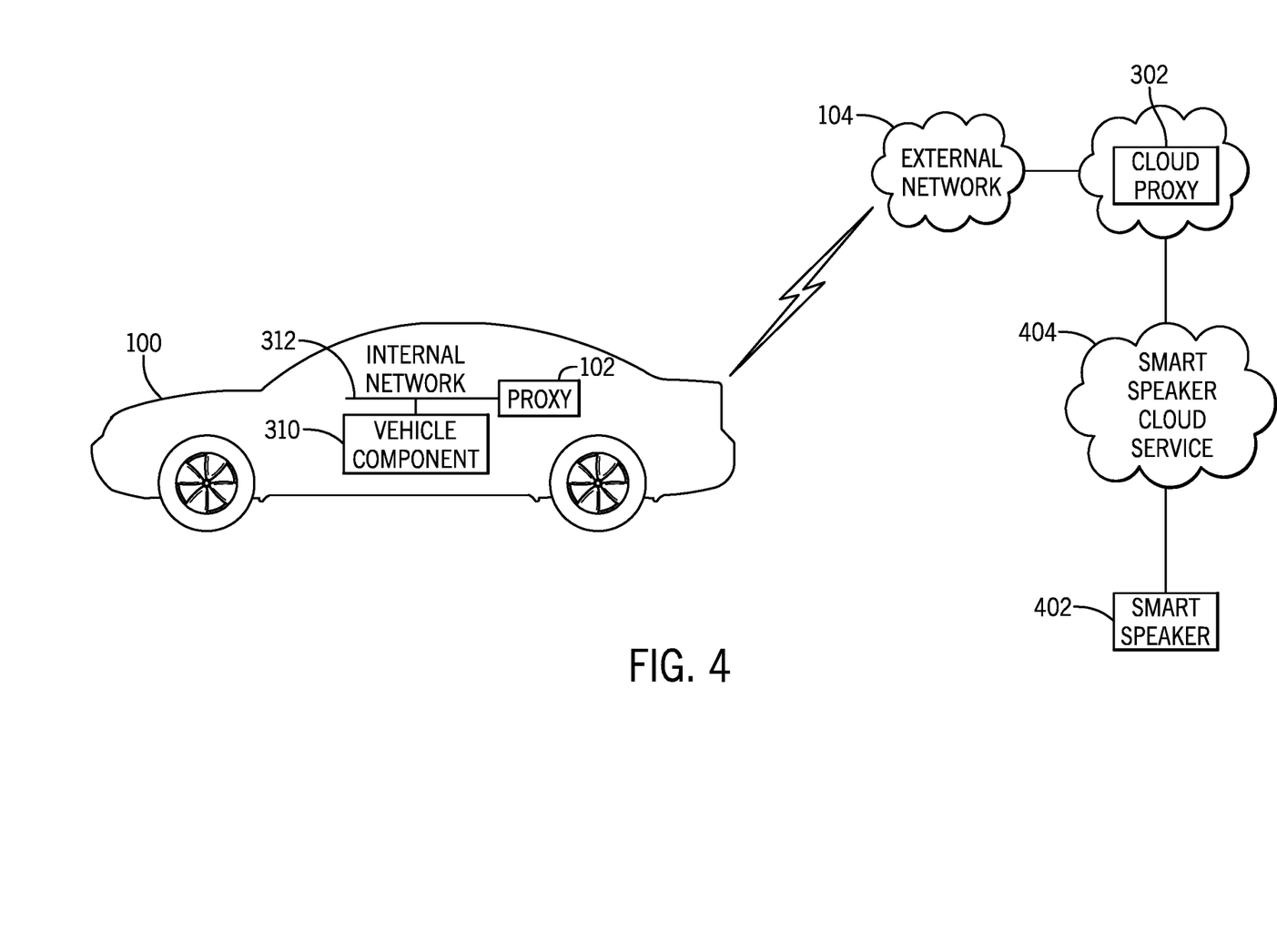
FIG. 4 is a block diagram of an example arrangement that includes a proxy in a vehicle, a cloud proxy, a smart speaker, and a smart speaker cloud service, according to other implementations of the present disclosure.

FIG. 4 illustrates an arrangement in which a user can use a smart speaker 402 to access the vehicle 100. A "smart speaker" refers to a device that is able to recognize user spoken commands. The smart speaker 402 may be located in the user's home, office, or other location. In some examples, the smart speaker 402 may even be located in the vehicle 100, or may be part of a user device.

In response to a spoken command (e.g., unlock vehicle door), the smart speaker 402 sends information of the spoken command to a smart speaker cloud service 404. The smart speaker cloud service 404 forwards the spoken command as a request to the cloud proxy 302 (or alternatively, to the proxy 102 in examples where the cloud proxy 302 is omitted). The proxy (302 or 102) can then forward the corresponding command to unlock the vehicle door over the internal network 312 of the vehicle 100.

To enable the smart speaker 402 to recognize vehicle commands and the smart speaker cloud service 404 to forward corresponding requests to the proxy (such as by calling an API of the proxy), the user can set up the smart speaker account at the smart speaker cloud service 404 to connect to the proxy. This involves authorizing the smart speaker cloud user account with the proxy (102 or 302), which may involve setting up credentials. This may also involve loading the smart speaker command processor (local to 402 or in cloud 404) with the available commands of the proxy API. This may involve mapping of the API calls to natural language conversation, sometimes called skills or actions.

In further examples, in addition to using a user device (e.g., 306 in FIG. 3), a smart speaker (e.g., 402 in FIG. 4), a user can use other endpoints to send requests to access aspects of the vehicle 100. For example, the user can use a display panel or other control console of the vehicle 100.

Figure 5:
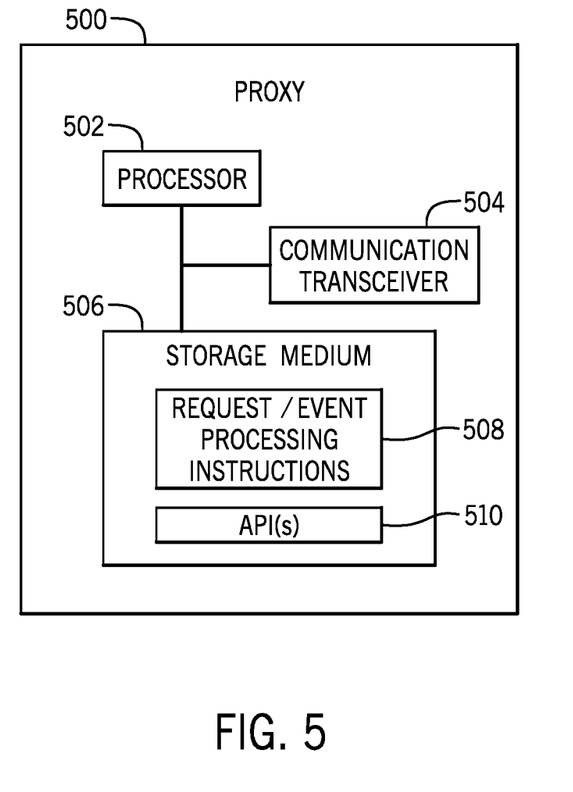
FIG. 5 is a block diagram of a proxy according to some implementations.

FIG. 5 is a block diagram of a proxy 500, which can be an example of the proxy 102 discussed above. The proxy 500 includes one or more hardware processors 502. A hardware processor can include a microprocessor, a core of a multi-core microprocessor, a microcontroller, a programmable integrated circuit, a programmable gate array, a digital signal processor, or another hardware processing circuit.

The proxy 500 includes a communication transceiver 504 to communicate over a communication medium. In addition, the proxy 500 includes a non-transitory machine-readable or computer-readable storage medium 506 storing machine-readable instructions executable on the one or more hardware processors 502 to perform various tasks.

The machine-readable instructions include request/event processing instructions 508 to process requests or events received from a network, such as the external network 104 or an internal network of the vehicle 100. The request/event processing instructions 508 can be part of the processing engine 228 of FIG. 2, for example.

The machine-readable instructions of the storage medium 506 further include instructions of one or more APIs 510, such as routines of the one or more APIs 510.

The storage medium 506 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   providing a proxy to control access to an internal network of a vehicle by entities coupled to an external network;
   exposing, by the proxy, different external application programming interfaces (APIs) to different classes of entities, wherein the different external APIs comprise a first API accessible by a first class of entities over the external network, and a second API accessible by a different second class of entities over the external network, and wherein each of the first API and the second API comprises a respective library of routines to be called by a respective entity; and
   responsive to a request received, at the first API, from a first entity over the external network to access a vehicle component over the internal network, applying, by the proxy, a security policy to determine whether to allow access to the vehicle component over the internal network.

2. The method of claim 1, wherein the proxy is part of the vehicle and is provided between the internal network of the vehicle and a network interface to the external network.

3. The method of claim 1, wherein the proxy is in a cloud.

4. The method of claim 1, wherein the external network includes a wireless network or a wired network.

5. The method of claim 1, further comprising:
   translating, by the proxy, the request to one or more commands over the internal network.

6. The method of claim 5, wherein the one or more commands translated from the request differ for different models of vehicles.

7. The method of claim 1, further comprising:
   updating the proxy in response to adding a feature to the vehicle.

8. A method comprising:
   providing a proxy to control access to an internal network of a vehicle by an entity coupled to an external network;
   responsive to a request received from the entity over the external network to access a vehicle component over the internal network, applying, by the proxy, a security policy to determine whether to allow access to the vehicle component over the internal network;
   assigning different security policies to different functional groups; and
   determining a given functional group, of the different functional groups, to which the entity belongs,
   wherein the security policy applied by the proxy is a security policy of the given functional group.

9. The method of claim 8, further comprising providing, by the proxy, an application programming interface (API) accessible by the entity over the external network or an internal network of the vehicle, wherein the request is received at the API.

10. The method of claim 9, wherein the API comprises a plurality of routines corresponding to different aspects of the vehicle accessible over one or more internal networks of the vehicle, the method further comprising:
    receiving, by the proxy, data corresponding to a user selection at a user interface, the user selection selecting which of the plurality of routines of the API are accessible over one or more external networks and which of the plurality of routines of the API are inaccessible over the one or more external networks.

11. The method of claim 10, wherein the user interface is presented at a vehicle console of the vehicle or at a user device.

12. The method of claim 8, further comprising providing, by the proxy, an application programming interface (API) accessible by the entity over the external network, wherein the request is received at the API, and wherein the different functional groups have access to different subsets of routines of the API.

13. The method of claim 8, further comprising:
registering the entity with the given functional group using a registration process that assigns a credential to the entity; and
establishing a connection between the proxy and the entity using the credential, the request received over the connection.

14. A system comprising:
a hardware processor; and
a storage medium storing proxy instructions executable on the hardware processor to:
receive a request from an entity over an external network that is separate from an internal network of a vehicle;
responsive to the request, apply a security policy to determine whether to allow access to a vehicle component over the internal network;
assign different security policies to different functional groups; and
determine a given functional group, of the different functional groups, to which the entity belongs,
wherein the security policy applied by the proxy instructions is a security policy of the given functional group.

15. The system of claim 14, further comprising:
an application programming interface (API) accessible by the entity over the external network or by the entity over an internal network of the vehicle, wherein the request is received at the API.

16. The system of claim 14, further comprising:
an application programming interface (API) accessible by the entity over the external network, wherein the request is received at the API, and
wherein the different functional groups have access to different subsets of routines of the API.

17. The system of claim 14, wherein the hardware processor is to update the proxy instructions responsive to an addition of a feature to the vehicle.

18. The system of claim 14, wherein the system is a cloud system, and the proxy instructions are accessible in a cloud.

* * * * *